United States Patent [19]

Lee

[11] Patent Number: 4,562,168
[45] Date of Patent: Dec. 31, 1985

[54] CATALYST AND OLEFIN POLYMERIZATION

[75] Inventor: Clifford C. Lee, Bartlesville, Okla.

[73] Assignee: Phillips Petroleum Company, Bartlesville, Okla.

[21] Appl. No.: 611,263

[22] Filed: May 17, 1984

[51] Int. Cl.$^4$ ............................................. C08F 4/64
[52] U.S. Cl. ................................... 502/107; 502/119; 502/125; 502/128; 502/131; 502/134; 526/125
[58] Field of Search ............... 502/107, 134, 119, 128, 502/131, 125

[56] References Cited

U.S. PATENT DOCUMENTS

| | | | |
|---|---|---|---|
| 3,412,174 | 11/1968 | Kroll ............................... | 502/117 X |
| 4,296,223 | 10/1981 | Berger ............................. | 526/125 |
| 4,325,837 | 4/1982 | Capshaw et al. ............... | 252/429 B |
| 4,326,988 | 4/1982 | Welch et al. .................... | 252/429 B |
| 4,363,746 | 12/1982 | Capshaw ......................... | 502/169 X |
| 4,384,087 | 5/1983 | Capshaw ......................... | 526/114 |

*Primary Examiner*—Patrick P. Garvin
*Attorney, Agent, or Firm*—Edward L. Bowman

[57] ABSTRACT

A polymerization catalyst providing a good balance of productivity and polymer fines prepared by reacting a metal halide, such as $MgCl_2$, with a titanium compound, such as $Ti(OEt)_4$, to form a first catalyst component; mixing a solution of said first catalyst component with an organoaluminum compound at a temperature in the range of $-100°$ to $70°$ C.; then heating to a higher temperature in the range of $50°$ C. to $110°$ C. to form additional precipitate, and then reacting the resulting solid with a halogenating agent.

22 Claims, No Drawings

CATALYST AND OLEFIN POLYMERIZATION

BACKGROUND OF THE INVENTION

This invention relates to catalysts, a method of producing the catalysts and a process for using the catalysts. In another aspect the invention relates to a particularly effective olefin polymerization catalyst and process.

In the production of polyolefins, such as for example polyethylene, polypropylene, ethylene-butene copolymers etc., an important aspect of the various processes and catalysts used to produce such polymers is the productivity. By productivity is meant the amount or yield of solid polymer that is obtained by employing a given quantity of catalyst. If the productivity is high enough then the amount of catalyst residues contained in the polymer is low enough that the presence of the catalyst residues does not significantly affect the properties of the polymer and the polymer does not require additional processing to remove the catalyst residues. As those skilled in the art are aware, removal of catalyst residues from polymer is an expensive process and it is very desirable to employ a catalyst which provides sufficient productivity so that catalyst residue removal is not necessary.

In addition to productivity of a catalyst, another important aspect of a process and a catalyst is the properties of the polymer particles. It is desirable to produce polymer particles which are characterized by strength, uniformity of size, and relatively low fines. Although polymer fluff having relatively high percentages of fines can be handled with plant modifications, a polymer of high productivity and low fines is highly desirable.

U.S. Pat. No. 4,363,746 discloses catalysts which are much more active than many of the polymerization catalysts previously existing. One such catalyst is prepared by reacting a metal halide, such as magnesium dichloride, and a transition metal compound, such as a titanium tetraalkoxide, to form a first catalyst component then reacting a solution of that first catalyst component with an organometallic reducing agent to obtain a solid, and then reacting the solid with a halide ion exchanging source such as titanium tetrachloride. Although such catalysts are extremely active, experience has shown that when they are used in commercial-scale loop reactors the level of fines is often greater than might be desired.

U.S. Pat. No. 4,326,988 discloses that by incorporating prepolymer on such catalysts one can reduce the level of polymer fines in the product without seriously affecting the productivity of the catalyst. The approach of employing prepolymer, however, adds the requirement of additional steps and reactants in the catalyst preparation and thus adds to the expense of producing the catalyst.

An object of the present invention is to produce modified catalysts of the type disclosed in U.S. Pat. No. 4,363,746 which provide excellent productivities and low levels of polymer fines without having to resort to the use of prepolymer.

SUMMARY OF THE INVENTION

In accordance with the present invention a catalyst is prepared by (1) reacting a metal halide and a transition metal compound to form a first catalyst component, (2) mixing a solution of said first catalyst component with a second catalyst component comprising an organoaluminum compound at a temperature in the range of about $-100°$ C. to about $70°$ C. to form a precipitate, (3) subjecting precipitate from step (2) in the presence of at least a portion of the supernatant liquid remaining after step (2) to a temperature higher than that used in step (2) and of at least $50°$ C. for a length of time sufficient to result in the formation of some additional amount of precipitate and (4) reacting solid precipitate resulting from step (3) with a halogen ion exchanging agent.

In an especially preferred embodiment at least a portion of the supernatant liquid remaining after step (2) is removed before step (3) is completed. Most preferably at least a portion of the supernatant liquid remaining after step (2) is removed before step (3) is conducted.

DETAILED DESCRIPTION

The metal halide employed in making the first catalyst component is selected from the group consisting of magnesium dihalides and magnesium hydroxyhalides. Examples of what is meant by magnesium dihalides are $MgCl_2$, $MgF_2$, $MgI_2$, $MgBr_2$. Examples of what is meant by magnesium hydroxyhalides include $Mg(OH)Cl$, $Mg(OH)Br_2$, $Mg(OH)I$. It is also within the scope of the invention to use metal halides complexed with one or more electron donors, such as compounds of the formula $MgCl_2.nED$ wherein ED is electron donor. Examples of typical electron donors are water, ammonia, hydroxylamines, alcohols, ethers, carboxylic acids, esters, acid chlorides, amides, nitriles, amines, dioxane, and pyridine. Examples of some specific magnesium halide complexes include $MgCl_2.H_2O$, $MgCl_2.2H_2O$, $MgCl_2.6H_2O$, $MgCl_2.4H_2O$, $MgBr_2.2H_2O$, $MgBr.H_2O$, $MgBr_2.4H_2O$, $MgBr.6H_2O$, $MgI_2.8H_2O$, $MgI_2.6H_2O$, $MgCl_2.6NH_3$, $MgCl_2.NH_3$, $MgBr_2.2NH_3$, $MgI_2.6NH_3$, $MgI.NH_3$, $MgCl_2.2NH_2OH.2H_2O$, $MgCl_2.6CH_3OH$, $MgCl_2.6C_2H_5OH$, $MgCl_2.6C_3H_7OH$, $MgCl_2.6C_4H_9OH$, $MgBr_2.6C_3H_7OH$, $MgCl_2.CH_3OH$, $MgCl_2.(C_2H_5)_2O$, $MgCl_2.6CH_3CO_2H$, $MgCl_2.2CH_3CO_2C_2H_5$, $MgBr_2.2C_6H_5CO_2C_2H_5$, $MgBr_2.4CO(NH_2)_2$, and $MgI_2.6CH_3CONH_2$, $MgBr_2.4CH_3CN$, $MgCl_2.3C_2H_4(NH_2)_2$, $MgCl_2.2N(C_2H_4OH)_3$, $MgCl_2.2C_6H_5NH_2.6H_2O$ and $MgBr_2.6C_6H_5NH_2$ and the like.

It is also possible to use mixed compositions containing the metal halide. Examples include compositions such as $MgCl_2.MgO.H_2O$, $MgCl_2.3MgO.7H_2O$, $MgBr_2.3MgO.6H_2O$, and the like.

It is currently preferred to use magnesium dihalides of the commercial variety which are conventionally called "anhydrous" but which are in fact magnesium dihalide hydrates containing 1 molecule or less of water per molecule of magnesium dihalide. "Commercial anhydrous" magnesium dichlorides are a typical example.

The transition metal compound used in making the first catalyst component is selected from titanium compounds wherein the titanium is bonded to at least one radical selected from the group consisting of hydrocarbyl oxides, hydrocarbyl imides, hydrocarbyl amides, and hydrocarbyl mercaptides. Examples of such compounds include mono, di, and trihalo substituted titanium compounds in which the remaining valences are filled with the previously enumerated radicals. The preferred titanium compounds are the non-halogenated titanium compounds in which each valence is filled by one of the enumerated radicals.

The titanium tetrahydrocarbyloxides are the preferred titanium compounds because they produce excellent results and are readily available. Suitable titanium tetrahydrocabyloxide compounds include those expressed by the general formula Ti(OR)$_4$ wherein each R is individually selected from an alkyl, cycloalkyl, aryl, alkaryl, and aralkyl hydrocarbon radical containing from about 1 to about 20 carbon atoms per radical and each R can be the same or different. Titanium tetrahydrocarbyloxides in which the hydrocarbyl group contains from about 1 to about 10 carbon atoms per radical are most often employed because they are more readily available. Suitable titanium tetrahydrocarbyloxides include, for example, titanium tetramethoxide, titanium dimethoxydiethoxide, titanium tetraethoxide, titanium tetra-n-butoxide, titanium-tetrahexyloxide, titanium tetradecyloxide, titanium tetraeicosyloxide, titanium tetracyclohexyloxide, titanium tetrabenzyloxide, titanium tetra-p-tolyloxide and titanium tetraphenoxide.

Of the titanium tetrahydrocarbyloxides, titanium tetraalkoxides are generally preierred and titanium tetraethoxide is particularly preferred because of the excellent results obtained employing this material. Titanium tetraethoxide is also generally available at a reasonable cost.

The molar ratio of the transition metal compound to the metal halide compound can be selected over a relatively broad range. Generally the molar ratio is within the range of about 10:1 to about 1:10, however, the most common molar ratios are within the range of about 2:1 to about 1:2. When titanium tetrahydrocarbyloxide and magnesium dichloride are employed to form a composition of matter of the invention, a molar ratio of titanium to magnesium of about 2:1 is presently recommended as all the magnesium compound apparently goes into solution easily.

The metal halide compound and the transition metal compound employed in the present invention are normally mixed together by heating, for example by refluxing, these two components together in a suitable dry (essential absence of water) solvent or diluent, which is essentially inert to those compounds and the product produced. By the term "inert" is meant that the solvent does not chemically react with the dissolved components such as to interfere with the formation of the product or the stability of the product once it is formed. Such solvents or diluents include, for example, n-pentane, n-heptane, methylcyclohexane, toluene, xylenes and the like. The temperature at which the metal halide and the Ti compound are brought into contact can vary over a wide range typically temperatures in the range of from about 50° C. to about −100° C. and preferabiy from about 10° C. to about 40° C. Generally the amount of solvent or diluent employed can be selected over a broad range. Usually the amount of solvent or diluent is within the range of about 20 to about 100 cc per gram of metal dihalide. The temperature employed after the two components are brought into contact can also be selected over a broad range. Normally the the two components are subjected to a temperature within the range of about 15° C. to about 150° C. when the heating step is carried out at atmospheric pressure. Obviously the temperatures employed could be higher if the pressure employed is above atmospheric pressure. The pressure employed during the heating does not appear to be a significant parameter.

In addition to the above noted solvents or diluents, more polar solvents or diluents such as nitrobenzene and halogenated hydrocarbons, e.g. methylene chloride, chlorobenzene and 1,2-dichloroethane can be used, particularly when producing compositions of the invention having a molar ratio of the transition metal compound to the metal dihalide compound of other than 2:1. In addition, normal saturated alkanols, such as, for example, ethanol, n-butanol and the like, and saturated ethers Particularly saturated cyclic ethers such as, for example, tetrahydrofuran, can be used alone or in combination with the previously mentioned solvents or diluents in producing catalyst compositions according to the invention. Mixed solvents or diluents, such as for example, a mixture of n-hexane and tetrahydrofuran having a volume/volume ratio of, for example, about 50/50 can be employed in solubilizing hydrocarbon-soluble metal dihalides which are relatively difficult to solubilize. Other suitable mixtures of two or more of the above solvents to solubilize the reagents of the first catalyst component can of course also be used and can be readily determined by one of ordinary skill in the art.

Generally, the time required for heating these two components together is within the range of about 5 minutes to about 10 hours, although in most instances a time within the range of about 15 minutes to about 3 hours is sufficient. Following the heating operation, the resulting solution can be filtered to remove any undissolved material or extraneous solid, if desired.

When a solution of the first catalyst component is reacted with the second catalyst component, generally better results are obtained if the solution is free of any solids which existed after the preparation of the first catalyst component.

The second catalyst component comprises an organoaluminum compound, such as for example dihydrocarbylaluminum monohalides of the formula R'$_2$AlX, monohydrocarbylaluminum dihalides of the formula R'AlX$_2$, hydrocarbyl aluminum sesquihalides of the formula R'$_3$Al$_2$X$_3$, and trihydrocarbyl aluminums of the formula R'$_3$Al wherein each R' in the above formulas is individually selected from linear and branched chain hydrocarbyl radicals containing 1 to 20 carbon atoms per radical which can be the same or different, and each X is a halogen atom which can be the same or different. Some typical specific examples of such compounds include triethylaluminum, trimethylaluminum, diethylmethylaluminum, methylaluminum dibromide, ethylaluminum dibromide, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, ethylaluminum sesquiiodide, and the like. Ethylaluminum sesquichloride, ethylaluminum dichloride, and diethylalumiunum chloride have been employed with good results and are preferred. The most preferred organoaluminum halide compound is ethylaluminum sesquichloride, which produced the best results.

The molar ratio of the transition metal compound of the first catalyst component to the second catalyst component can be selected over a relatively broad range. Generally, the molar ratio of the transition metal of the first catalyst component to the second catalyst component is within a range of from about 10:1 to about 1:10 and more generally within a range of about 2:1 to about 1:3 since a molar ratio within the latter range usually produces a catalyst which can be employed as an especially active ethylene polymerization catalyst.

The metal halide compound/transition metal compound solution described above (which is formed by dissolving the recovered composition of matter in a suitable solvent or which is formed initially without recovering the composition of matter from the solvent) is then contacted with the second component of the catalyst, preferably a hydrocarbon solution of the second component. A solid reaction product is formed which precipitates out of the solution.

The temperature employed while mixing the first and second catalyst components as above described can be selected over a broad range. Generally the temperature employed is within a range of about $-100°$ C. to about $70°$ C. The present invention is particularly useful for situations wherein the first and second catalyst components are combined at a temperature no greater than $50°$ C. Since heat is evolved when the first catalyst component and the second catalyst component are mixed, the mixing rate is preferably adjusted as requires and additional cooling is employed in order to maintain a relatively constant mixing temperature. It is noted with respect to mixing the first and second components that either component can be added to the other.

After all, or at least a portion of the organoaluminum compound, has been combined with the first catalyst component solution the resulting mixture is subjected to a temperature higher than that used in the mixing of the two components, said temperature being at least $50°$ C., more generally in the range of about $50°$ C. to about $150°$ C., more preferably in the range of about $50°$ C. to about $110°$ C. and even more preferably in the range of about $90°$ to about $110°$ C. The mixture is maintained at a temperature in that range for a length of time sufficient to result in the formation of some additional amount of precipitate. The exact length of time needed in order for the heat treatment to give the best results in terms of yield of solids and of final catalyst integrity can be determined by routine experimentation. Typically the heat treatment will be maintained for about 15 minutes to about 5 hours. It is generally preferred to stir or agitate the mixture during the heat treatment.

After the described heat treatment the solids are contacted with the halogen ion exchanging agent, i.e., a compound capable of increasing the halogen content of the solid and capable of increasing the polymerization activity of the solid. Typical examples of halogenating agents considered to be suitable include compounds having at least one halogen bonded to an element selected from the group consisting of H, S, C, B, Si, Sn, Ge, P, Ti, Zr, and V. Some typical examples of such compounds include $CCl_4$, $BCl_3$, $SiCl_4$, $SiHCl_3$, $SnCl_4$, $PCl_3$, benzoyl chloride, acetyl chloride, HCl, $Si_4Cl_{10}$, $C_2H_5SiCl_3$, $CH_3iCl_2H$, $(CH_3)_2SiCl_2$, $Si(OC_2H_5)Cl_3$, $TiCl_4$, $TiBr_4$, $TiI_4$, $VOCl_3$, $Si_2OCl_6$, $SOCl_2$. It is also possible to use mixtures of halogenating agents. It is currently preferred to use a halide of Ti, Zr, or V, especially a titanium tetrahalide such as $TiCl_4$.

Although it is not absolutely necessary it is generally preferred to wash the solids to remove soluble materials prior to contacting the solids with the halogen ion exchanging agent. Typically, a hydrocarbon liquid such as n-pentane, n-heptane, cyclohexane, benzene, n-hexane, xylenes, or the like would be used for the washing step.

Generally, treating the catalyst with the halide ion exchanging source takes place in a suitable diluent such as a hydrocarbon diluent, for example, n-pentane, n-heptane, n-hexane, cyclohexane, benzene, xylenes, and the like, to facilitate the treating process. The treating temperature can be selected over a relatively broad range and is normally within a range of about $0°$ C. to about $200°$ C.

The treating time can also be selected over a broad range and generally is within the range of about 10 minutes to about 10 hours. While the weight ratio of the halide ion exchanging source to the solids can be selected over a relatively broad range, the weight ratio of the halide ion exchanging source to the solids is generally within a range of about 10:1 to about 1:10 and more generally from about 7:1 to about 1:4. Although excess halogenating agent does appear to adversely affect the catalyst; it does, however, obviously result in additional expense. Following the treatment of the solids with the halide ion exchanging source the surplus halide ion exchanging source is removed by washing with a dry (essential absence of water) liquid such as a hydrocarbon of the type previously disclosed, n-hexane, or xylene for example. The resulting product, catalyst B, after drying, is stored under dry nitrogen.

In especially preferred embodiments of the present invention at least a portion of the supernatant liquid remaining after step (2) is removed before step (3) is completed. The supernatant liquid can be removed in a suitable manner. One technique simply involves allowing the solids to settle and then carefully pouring off the liquid while being careful not to waste the solids. A preferred technique for removing the supernatant liquid involves the use of a decant tube containing an internal filter that will protect against the loss of desirable solids. The decant filter tube was used in the catalyst preps described below which involve the decanting of the supernatant liquid.

The amount of supernatant liquid withdrawn can vary over a wide range depending upon the results desired. It is currently preferred, however, to decant off about $\frac{1}{4}$ to about 5/6 of the volume of the supernatant liquid, more preferably about $\frac{1}{2}$ to about $\frac{3}{4}$ of the volume. Removing portions of the supernatant liquid results in a reduction in the amount of titanium remaining in polymers produced with the catalyst. It also results in a more active catalyst. In the most preferred embodiments it also results in polymer having much lower levels of polymer fines than is obtained using a catalyst prepared without the decanting of the liquid.

The catalysts of the present invention are useful in the polymerization of a variety of polymerizable compounds. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms would be most often used. The mono-1-olefins can be polymerized according to the present invention employing either a particle form process or a solution form process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above include mono-1-olefins previously described and vinylaromatic compounds generally. Some suitable vinylaromatic compounds are those having from about 8 to about 14 carbon atoms per molecule, and include for example styrene and various alkylstyrenes, such as 4-ethylstyrene and such as 1-vinylnaphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

In one aspect of the invention, the catalysts of the present invention have benn found to be particularly effective for polymerization of mono-1-olefins such as ethylene as extremely high productivities have been obtained and thus mono-1-olefins such as ethylene are the preferred monomers for use with the catalysts of the present invention.

While it may not be necessary in all instances to employ a cocatalyst with the catalyst of the present invention, the use of cocatalysts is recommended for best results. The organometallic cocatalyst suitable for use in accordance with the invention are the same as the organometallic compounds generally found suitable for use as with transition metal based polymerization catalysts. Some typical examples include organometallic compounds in which the metal is selected from Groups I, II, and III, for example lithium alkyls, Grignard reagents, dialkyl magnesium compounds, dialkyl zinc compounds, and organoaluminum compounds. Of the organometallic cocatalysts, the organoaluminum cocatalysts are preferred, typical examples include those described above as suitable for use as the second component of the catalyst. Triethylaluminum is preferred since this compound produced excellent results in the runs hereafter described.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane, for example. When the catalyst and cocatalyst are employed, either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the ethylene is then admitted and maintained at a partial pressure within a range of about 0.5 MPa to about 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reaction product is continuously withdrawn and the polymer recovered as appropriate, generally by flashing the diluent (solvent) and unreacted monomers and drying the resulting polymer.

The olefin polymers made with the catalysts of this invention are useful in preparing articles by conventional polyolefin processing techniques such as injection molding, rotational molding, extrusion of film, and the like. For example, polyethylene made with the catalysts of this invention is typically of narrow molecular weight distribution which is especially desirable for injection molding applications. Furthermore, the polyethylene produced as described generally has a desirable high bulk density of about 0.43 g/cc as recovered from the polymerization zone. In addition, the polyethylene produced as described is characterized by a high degree of stiffness, e.g. high flexural modulus, which is also desirable in many applications.

The present invention and its advantages will be further illustrated by the following examples:

EXAMPLE 1

Preparation of Invention Catalyst

A 100 gal (378 L) Pfaudler reactor substantially free of water and oxygen was charged with 57 gal (216 L) of n-hexane, 6.17 lbs (29.4 moles) of particulate $MgCl_2$ (containing about 1 weight percent water) and 27 lbs (53.7 moles) of $Ti(OEt)_4$ under a $N_2$ atmosphere. The stirred mixture was heated for 1 hour at 100° C. and cooled to 30° C. To it over a 2 hour period was added 58.5 lbs of a solution containing 25.4 weight percent EASC in n-hexane (26.8 moles EASC) while the temperature was maintained at about 30° C. Mole ratios used correspond to $Ti(OEt)_4:MgCl_2$ of 1.83:1, $Ti(OEt)_4$:EASC of 1.96:1 and $MgCl_2$:EASC of 1.08:1. The stirred slurry was heated to 90° to 100° C. for nearly 2 hours (1.95 hours) and stirred an additional 30 minutes while the temperature was reduced to 30° C. The solids were allowed to settle, mother liquor was decanted, 50 gal (189 L) of n-hexane added and mixed with the slurry. The solids were allowed to settle, supernatant liquid decanted, 40 gal (151 L) of n-hexane was added and the process repeated. Finally 40 gal of n-hexane was mixed with the slurry and to the stirred mixture at 30° C. was added 36 lbs (86 moles) of $TiCl_4$ to provide a calculated weight ratio of $TiCl_4$ to initial $MgCl_2$ of 5.83:1. The mixture was stirred for 60 minutes at 30° C., the solids allowed to settle, mother liquor decanted, 50 gal of n-hexane added and mixed with the slurry. Supernatant liquid was decanted and the slurry washed 4 times as before using 40 gal of n-hexane per wash for the first 3 washes and 33 gal (125 L) n-hexane for the final wash. The final decanting was made and the catalyst slurry weighing 187 lbs (85 kg) passed to a dry receiver containing nitrogen for storage.

EXAMPLE 2

Comparison

The 100 gal Pfaudler reactor substantially free of water and oxygen was charged with 57 gal of n-hexane, 12.35 lbs (58.8 moles) of the particulate $MgCl_2$ used in making the Invention Catalyst and 54 lbs (107.4 moles) of the $Ti(OEt)_4$ lot previously used. The stirred mixture was heated for 1 hour at 100° C. and cooled to 30° C. as before. To the mixture over a 4 hour period was added 117 lbs (53.6 moles EASC) of the same EASC solution previously used while the temperature was maintained at about 30° C. Mole ratios used of $Ti(OEt)_4:MgCl_2$, $Ti(OEt)_4:EASC$ and $MgCl_2:EASC$ were the same as for the Invention Catalyst. The solids were allowed to settle and without any heating the mother liquor was immediately decanted. As before the solids were washed once with 50 gal of n-hexane and once with 40 gal of n-hexane. Finally, 40 gal of n-hexane was added, the nitrogen pressure in the Pfaudler reduced to less than 2 psi(14K Pa), pressured to 20 psi (138K Pa) with ethylene gas for 5 min and depressured to less than 2 psi. 16 lbs (7.45 moles EASC) of the EASC solution was added. After mixing for 30 minutes, residual ethylene was purged with nitrogen, solids allowed to settle, supernatant liquid removed and the solids washed 2 times as before using 33 gal of n-hexane per wash. Finally 33 gal of n-hexane were added along with 36 lbs of $TiCl_4$ to provide a calculated weight ratio of $TiCl_4$ to initial $MgCl_2$ of 2.9:1. The $TiCl_4$ treatment and purification of the product was conducted exactly as before. The final catalyst slurry containing 8.1 wt % prepolymer on the catalyst, weighing 179.5 lbs (81.6 kg), was passed for storage to a dry receiver containing nitrogen.

EXAMPLE 3

Ethylene Polymer Production

Ethylene homopolymers and ethylene/1-hexene copolymers were prepared using inventive catalyst from Example 1 and comparison catalyst of Example 2 in a 19.8 gal loop reactor under liquid full conditions using isobutane as diluent at steady state conditions with a nominal reactor pressure of 595 psia (4.10 MPa), agitator speed of 1850 RPM and a production rate of about 25 lbs. polymer per hour. Ethylene concentrations ranged from 5.5 to 7 mole percent based on diluent, triethylaluminum (TEA) cocatalyst concentrations ranged from about 29 to 33 ppm based on diluent, residence times ranged from about 1.3 to about 1.4 hours per run, the mole ratios of hydrogen:ethylene in the reactor ranged from about 0.05:1 to 0.2:1 and reactor temperatures ranged from about 92° to 102° C. Polymer slurry was intermittently discharged from the reactor, contacted with dry $CO_2$ to deactivate catalyst and cocatalyst, and flashed to remove gaseous products. The recovered polymer was dried, treated with conventional amounts of a conventional stabilizer system, e.g. mixture of 2,6-di-t-butyl-4-methylphenol and dilauryl thiodipropionate to give about 0.1 weight percent stabilizer based on polymer plus stabilizer, and selected properties were measured such as melt index (ASTMD 1238, condition E-g/10 min), density (ASTM D1505-g/cm³), bulk density of dried as-made polymer and Ti content of the polymer from which catalyst productivity was determined.

In addition polymer fines were determined for each polymer made by tumbling a representative blend of each polymer type made for about 20 minutes. A polymer sample of about 200 g was removed, weighed and screened for 15 minutes using an electric RO-Tap Sieve Shake manufactured by the U.S. Tyler Manufacturing Company, Cleveland, Ohio. However, any other sieve shaker employing mechanical or hand shaking could be used. The amount of polymer fines of less than 100 and 200 mesh size was determined by weighing and from the values were calculated the weight percent fines of less than 100 and 200 mesh size for each polymer so tested. Previous experience has indicated that catalysts producing ethylene polymers of about 30 melt index containing about 6 weight percent or less fines of less than 200 mesh in size in the 19.8 gal loop reactor will perform satisfactory in commercial size handling equipment. Polymers containing more than about 6 weight percent fines of less than 200 mesh in size may present handling problems in transfer operations and in even feeding to processing machines such as extruders.

The polymerization conditions and results are presented in Table I wherein the values presented are the average of the runs made with each catalyst.

TABLE I

| | | | | Ethylene Polymer Production in Loop Reactor | | | |
|---|---|---|---|---|---|---|---|
| Run No. | Cat No. | Reactor Temp. °C. | TEA ppm | Mole % | | Polym. Time, hrs | Catalyst Productivity Kg/g Solid Catalyst |
| | | | | 1-Hexene | Hydrogen | | |
| 1 | B | 102 | 29.3 | 0 | 1.1 | 1.31 | 40.0 |
| 2 | A | 102 | 31.0 | 0 | 0.95 | 1.28 | 30.9 |
| 3 | A | 100 | 29.0 | 3.3 | 0.98 | 1.31 | 43.0 |
| 4 | A | 100 | 30.9 | 2.8 | 0.85 | 1.30 | 48.1 |
| 5 | A | 100 | 31.4 | 3.0 | 0.84 | 1.29 | 49.6 |
| 6 | A | 102 | 32.3 | 0.2 | 0.38 | 1.28 | 54.0 |
| 7 | A | 92 | 29.9 | 10.7 | 0.32 | 1.37 | 47.9 |
| 8 | A | 92 | 33.0 | 11.2 | 0.41 | 1.43 | 45.6 |

Notes:
Catalyst A is invention, catalyst B is comparison. TEA concentration is based on diluent. 1-hexene is based on ethylene charged to reactor. Hydrogen concentration is based on ethylene charged to reactor. Catalyst productivity was based on analyzed Ti found in the polymer. It is given in terms of kg polymer per g solid catalyst for the stated polymerization time. The value given is the average of at least two samples taken at different times during the continuous polymerization.

The results given in Table I runs 1, 2 show that the invention catalyst and the comparison catalyst are approximately equal in activity at similar reaction conditions. Runs 3-8 indicate that the invention catalyst retains its activity in the production of ethylene/1-hexene copolymers over a range of polymerization conditions and 1-hexene concentrations.

The nature of the various polymers produced employing the conditions set forth in Table I is given in Table II.

TABLE II

| | | Density, g/cc | | MI | Ti | Fines | |
| Run No. | Sample No. | Bulk | Molded | g/10 min | ppm | −200 mesh | −100 mesh |
| --- | --- | --- | --- | --- | --- | --- | --- |
| 1 | 1P | 0.457 | 0.9671 | 29 | 2.4 | 4.1 | 17 |
| 2 | 2P | 0.425 | 0.9661 | 31 | 11 | 3.9 | 24 |
| 3 | 3P | 0.439 | 0.9547 | 30 | 7.8 | 2.0 | 20 |
| 4 | 4P | 0.432 | 0.9541 | 18 | 7.1 | 1.3 | 18 |
| 5 | 5P | 0.439 | 0.9532 | 15 | 6.9 | 1.5 | 20 |
| 6 | 6P | 0.351 | 0.9541 | 1.0 | 6.3 | 0.82 | 12 |
| 7 | 7P | 0.400 | 0.9390 | 1.3 | 7.1 | 0.54 | 11 |
| 8 | 8P | 0.405 | 0.9406 | 3.0 | 7.5 | 1.2 | 12 |

The results set forth in Table II show in run 1P (comparison catalyst) and run 2P (invention catalyst) at similar melt index and molded density values that the invention catalyst produces slightly fewer polymer fines of less than 200 mesh than the comparison catalyst. This is significant because producing the invention catalyst is more convenient from a process viewpoint than producing the comparison catalyst which must have prepolymer applied to reduce polymer fines. However, the invention catalyst does produce slightly more polymer fines of less than 100 mesh than the comparison catalyst. The bulk density of the as-made polymer fluff (powder) is seen to be slightly less for polymer made with the invention catalyst than with the comparison catalyst. The difference in bulk density is insignificant from a processing standpoint.

The invention catalyst contains more titanium than the comparison catalyst which is reflected in the higher titanium levels found in the polymers. The higher titanium levels are tolerable, however, and can be compensated by employing suitable stabilizing systems, containing for example, a metal stearate such as calcium stearate, with antioxidants as is well known in the art.

Sample runs 3P–8P show that a range of ethylene homopolymers and copolymers of various melt index and density values can be made with the invention catalyst thus demonstrating its versatility in producing commercial grade polymers.

Particle size analyses of catalysts produced according to the invention (Example 1) and related prior art catalysts containing applied prepolymer (Example 2) have shown that the mean for the invention catalyst was 7.7 microns while that of the comparison catalyst was 87 microns. In addition, 10 weight percent of the invention catalyst particles were less than 4 microns in size whereas only 0.6 weight percent of the comparison catalyst particles were in this size range. In spite of the striking size differences in the catalysts, both produced about the same amount of polymer fines of less than 200 mesh size in the loop reactor. It is speculated that the particles of invention catalyst retain their size integrity (rigidity), e.g., are resistant to attrition under the turbulent conditions in the loop reactor, and consequently relatively low amounts of less than 200 mesh polymer particles are generated. This suggests that for the inventive catalyst it is particle integrity, not particle size or particle size distribution, that plays the predominant role in determining the amount of polymer fines generated in the polymerization process in a loop reactor.

EXAMPLE 4

Catalyst Preparation

A series of 5 catalysts was prepared in the 100 gal Pfaudler reactor employing in each catalyst preparation as initial components, 57 gal of n-hexane, 4000 g (42.0 moles) of the particulate $MgCl_2$ used before and 38.5 lbs (76.5 moles) of $Ti(OEt)_4$. The stirred mixture was heated for 1 hour at 100° C. and cooled to 30° C. under a $N_2$ atmosphere to form a solution as before. Each stirred solution was contacted with 83.5 lbs of a solution containing 25.4 weight percent EASC in n-hexane (38.9 moles of EASC) over a 3 hour period while maintaining the reaction temperature at about 30° C. Mole ratios used correspond to $Ti(OEt)_4$:$MgCl_2$ of 1.82:1, $Ti(OEt)_4$ EASC of 1.97:1, and $MgCl_2$:EASC of 1.08:1. The treatment that each resulting slurry obtained before the solids were washed with n-hexane as described in the preceding examples is specified below. The washed solids were contacted with 36.0 lbs. (86.0 moles) of $TiCl_4$ for 1 hour, the resulting catalyst slurry was allowed to settle and the solids washed with n-hexane all as described before. In each preparation, the calculated weight ratio of $TiCl_4$ to initial MgCl was 4.40:1.

Catalyst C:

After the addition of EASC at 30° C. was complete, the stirred mixture was heated to 100° C., held there for 20 minutes, then cooled to 30° C. while continuing agitation. Agitation was stopped and the solids allowed to settle for 1 hour. The supernatant liquid, i.e. mother liquor amounting to about 300 lbs. (about 53 gal) was then decanted, the operation requiring 95 minutes. The solids were washed with portions of n-hexane and the preparation of the catalyst resumed as described in Example 1.

Catalyst D:

After the addition of EASC at 30° C. was complete, the agitation was stopped and about ¼ of the supernatant liquid, i.e. mother liquor (about 75 lbs., about 13 gal) was decanted in 10 minutes. The remaining mixture, with agitation resumed, was heated to 100° C. and held there for 20 minutes. The mixture was then cooled to 30° C. and the solids allowed to settle for 1 hour. The remaining ¾ of the mother liquor was decanted, the operation consuming 70 minutes. The solids were washed with n-hexane and the preparation of the catalyst resumed as before.

Catalyst E:

After addition of the EASC at 30° C. was complete, the agitation was stopped about and ½ of the mother liquor (approximately 150 lbs, about 26 gal) was decanted in 15 minutes. The remaining mixture, with agitation resumed, was heated to 100° C. and held there for 20 minutes. The mixture was then cooled to 30° C. and the solids allowed to settle for 45 minutes. The remaining ½ of the mother liquor was then decanted, the operation taking 65 minutes. The solids were washed with n-hexane and catalyst preparation resumed as before.

Catalyst F:

After addition of EASC at 30° C. was completed, the agitation was stopped and about ¾ of the mother liquor (about 225 lbs, about 40 gal) decanted in 26 minutes. The remaining mixture, with agitation resumed, was heated to 100° C., held there for 20 minutes and then cooled to 30° C. The solids were allowed to settle for 20 minutes. The remaining ¼ of the mother liquor was then decanted, the operation taking 10 minutes. The solids were washed with n-hexane and catalyst preparation resumed as before.

Catalyst G:

After addition of the EASC at 30° C. was completed the agitation was stopped and the mother liquor (about 300 lbs, about 53 gal) was decanted in 42 minutes. Then 13 gal (49 L) of n-hexane was added to the reactor and agitation of the mixture resumed. The mixture was heated to 100° C., held there for 20 minutes, then cooled to 30° C. and the solids allowed to settle for 25 minutes. The n-hexane, about 13 gal, was decanted in 15 minutes. The solids were washed with n-hexane and catalyst preparation resumed as before.

The weights of final catalyst slurries recovered for Catalysts C–G ranged from 178.5 to 180.5 lbs.

EXAMPLE 5

Ethylene Polymerization

Ethylene homopolymers were prepared from portions of the invention catalysts of Example 4 in the 19.8 gal loop reactor. In this series of runs, ethylene concentrations ranged from 5.9 to 6.1 mole percent based on diluent and the mole ratios of hydrogen:ethylene ranged from 0.147 to 0.172. The production rate of polyethylene averaged about 25 lbs/hr and the calculated weight of solids in the reactor varied from about 32 to about 34 lbs at steady state conditions. In all runs, a reactor temperature of 102° C. was employed, the nominal reactor pressure was 595 psia and the agitator speed was 1850.

The other conditions employed and results obtained are presented in Table III.

The polymers were recovered, stabilized and selected physical properties determined as described in Example 3. The results are set forth in Table IV.

TABLE III

Ethylene Polymer Production in Loop Reactor

| Run No. | Catalyst No. | TEA ppm | Mole % $H_2$ | Polym Time hrs | Catalyst Productivity kg/g solid cat |
|---|---|---|---|---|---|
| 9  | C | 50.8 | 0.87 | 1.29 | 27.3 |
| 10 | D | 28.0 | 0.95 | 1.27 | 32.9 |
| 11 | E | 28.1 | 1.0  | 1.25 | 42.8 |
| 12 | F | 28.2 | 0.96 | 1.25 | 44.7 |
| 13 | G | 34.1 | 0.90 | 1.30 | 42.5 |

The catalyst productivity results shown in Table III indicate that catalyst activity increases as the amounts of mother liquor decanted goes from zero in catalyst C of run 9 to ¾ in catalyst F of run 12 which appears to be near optimum in this series. Catalyst E of run 11 in which ½ of the mother liquor was decanted and catalyst G of run 13 in which substantially all of the mother liquor was decanted are about equal in activity and slightly lower in activity than catalyst F.

TABLE IV

| Run No. | Sample No. | Density Bulk | g/cc Fluff | MI g/10 min | Ti ppm | Wt % Fines −200 mesh | Wt % Fines −100 mesh |
|---|---|---|---|---|---|---|---|
| 9  | 9P  | 0.418 | 0.9673 | 32 | 11.6 | 6.6 | 20 |
| 10 | 10P | 0.410 | 0.9673 | 28 | 8.5  | 7.3 | 20 |
| 11 | 11P | 0.429 | 0.9676 | 33 | 6.5  | 5.0 | 19 |
| 12 | 12P | 0.431 | 0.9671 | 27 | 5.9  | 3.0 | 15 |
| 13 | 13P | 0.439 | 0.9675 | 28 | 5.5  | 6.9 | 20 |

The results in Table IV show that the polymers all have about the same fluff density at about the same melt index. However, the data show that removing portions of the mother liquor after the precipitation step with EASC can significantly lower the residual titanium level in polymers made with the catalyst. The treatment can also significantly modify catalyst activity and catalyst behavior in ethylene polymerization insofar as the formation of polymer fines are concerned. The results also suggest that the treatment can modify the catalyst so that it produces slightly higher bulk density polymer with increasing amounts of mother liquor removal.

The invention catalysts employed in runs 10-12 were made in which, respectively, ¼, ½ and ¾ of the mother liquor resulting from the precipitation step with EASC was removed before the resulting composition was heated and catalyst preparation was resumed.

The polymer in sample 10 P has a lower Ti content than the polymer of sample 9 P. The catalyst (run 10) produced slightly higher fines, 7.3 weight percent −200 mesh fines vs the 6.6 weight percent −200 mesh fines produced with the catalyst in run 9.

As the fines analyses for the samples 11 P and 12 P show, the catalysts prepared by decanting ½ and particularly ¾ of the mother liquor in the precipitation step with EASC, exhibit a substantially lower propensity for producing −200 mesh polymer fines than any of the other catalysts employed in this series. Sample 11 P had 5.0 weight percent −200 mesh fines and sample 12 P had only 3.0 weight percent −200 mesh fines.

The results demonstrated in Examples 4, 5 indicate that active ethylene polymerization catalysts which do not require added prepolymer for polymer fines control can be made. Furthermore, by decanting between about ¼ to about 5/6 (estimated) of the mother liquor produced in the precipitation step with EASC before heating the remaining mixture and then continuing catalyst preparation, it becomes possible to retain good catalyst activity, obtain excellent polymer fines control and substantially reduce residual titanium in the polymer.

What is claimed is:

1. A process for making a catalyst comprising
   (1) reacting a metal halide selected from the group consisting of magnesium dihalides and magnesium hydroxyhalides and a transition metal compound wherein the transition metal is titanium bonded to at least one radical selected from the group consisting of hydrocarbyl oxides, imides, amides, and mercaptides to form a first catalyst component,
   (2) mixing a solution of said first catalyst component with a second catalyst component comprising an organoaluminum compound at a temperature in the range of about −100° C. to about 70° C. to form a precipitate,
   (3) subjecting precipitate from step (2) in the presence of at least a portion of the supernatant liquid remaining after step (2) to a temperature higher than that used in step (2) and of at least 50° C. for a length of time sufficient to result in the formation of some additional amount of precipitate, and
   (4) reacting solid precipitate resulting from step (3) with a halogen ion exchanging agent.

2. A process according to claim 1 wherein step (3) is conducted at a temperature in the range of about 50° C. to about 110° C.

3. A process according to claim 2 wherein said metal halide comprises magnesium dichloride.

4. A process according to claim 3 wherein said transition metal compound comprises a titanium compound of the formula

$$Ti(OR)_4$$

wherein each R, which may be the same or different, is an alkyl radical containing 1 to 10 carbon atoms.

5. A process according to claim 4 wherein said second catalyst component is a hydrocarbylaluminum halide selected from those having formulas:

$R'AlX_2$, $R'_2AlX$, and $R'_3Al_2X_3$ wherein each R' is individually selected from linear or branched chain hydrocarbyl radicals containing 1 to 20 carbon atoms and X is a halogen atom.

6. A process according to claim 5 wherein said halogen ion exchanging agent comprises $TiCl_4$.

7. A process according to claim 6 wherein said second catalyst component comprises ethylaluminum sesquichloride.

8. A process according to claim 7 wherein step (3) is conducted at a temperature in the range of about 90° C. to about 110° C.

9. A process according to claim 8 wherein said transition metal compound consists essentially of titanium tetraethoxide.

10. A catalyst produced by the process of claim 9.

11. A catalyst produced by the process of claim 1.

12. A process according to claim 9 wherein at least a portion of the supernatant liquid is removed before step (3) is completed.

13. A process according to claim 9 wherein ¼ to 5/6 of the volume of the supernatant liquid is removed before step (3) is conducted.

14. A process according to claim 9 wherein ¼ to ¾ of the volume of the supernatant liquid is removed before step (3) is conducted.

15. A catalyst produced by the process of claim 13.

16. A process according to claim 1 wherein at least a portion of the supernatant liquid is removed before step (3) is completed.

17. A process according to claim 16 wherein ¼ to 5/6 of the volume of the supernatant liquid is removed before step (3) is conducted.

18. A process according to claim 16 wherein ½ to ¾ of the volume of the supernatant liquid is removed before step (3) is conducted.

19. A catalyst produced by the process of claim 17.

20. A process according to claim 1 wherein step (2) is conducted at a temperature in the range of about −100° C. to about 50° C.

21. A process according to claim 7 wherein step (2) is conducted at a temperature of about 30° C.

22. A process according to claim 9 wherein step (2) is conducted at a temperature of about 30° C.

* * * * *